US010138146B2

(12) United States Patent
Malmquist

(10) Patent No.: US 10,138,146 B2
(45) Date of Patent: Nov. 27, 2018

(54) BRINE FILTRATION DEVICE

(71) Applicant: Mark Malmquist, Irvine, CA (US)

(72) Inventor: Mark Malmquist, Irvine, CA (US)

( * ) Notice: Subject to any disclaimer, the term of this patent is extended or adjusted under 35 U.S.C. 154(b) by 219 days.

(21) Appl. No.: 14/980,367

(22) Filed: Dec. 28, 2015

(65) Prior Publication Data

US 2017/0183241 A1    Jun. 29, 2017

(51) Int. Cl.
| | |
|---|---|
| *C02F 1/02* | (2006.01) |
| *C02F 1/76* | (2006.01) |
| *B01D 24/08* | (2006.01) |
| *C25B 1/26* | (2006.01) |
| *C02F 1/467* | (2006.01) |
| *C02F 1/00* | (2006.01) |

(52) U.S. Cl.
CPC ............ *C02F 1/4674* (2013.01); *B01D 24/08* (2013.01); *C25B 1/26* (2013.01); *C02F 1/001* (2013.01); *C02F 2201/4618* (2013.01)

(58) Field of Classification Search
CPC ............. B01D 24/08; C02F 1/4674; C02F 2201/4618; C02F 1/001; C25B 1/26
See application file for complete search history.

(56) References Cited

U.S. PATENT DOCUMENTS

| | | | |
|---|---|---|---|
| 2,873,236 A * | 2/1959 | Ferris ................. | C02F 1/46104 204/233 |
| 3,227,524 A | 1/1966 | White | |
| 3,312,349 A * | 4/1967 | Rosaen ............... | B01D 24/008 210/283 |
| 3,800,026 A | 3/1974 | Morgan | |
| 4,121,300 A | 10/1978 | Cosma et al. | |
| 4,583,594 A * | 4/1986 | Kojicic ............... | B01D 24/007 166/228 |
| 4,889,623 A | 12/1989 | Prior et al. | |
| 5,034,127 A | 7/1991 | Yagishita et al. | |
| 5,169,406 A | 12/1992 | Tewari | |

(Continued)

OTHER PUBLICATIONS

Westerling, Kevin, A Beginner's Guide to On-Site Sodium Hypochlorite Generation, Water Online (online), published Aug. 21, 2014 (retrieved as early as Dec. 28, 2015), retrieved from the internet <URL: http://www.materonline.com/doc/a-beginner-s-guide-to-on-site-sodium-hypochlorite-generation-0001>.

(Continued)

*Primary Examiner* — Matthew O Savage
(74) *Attorney, Agent, or Firm* — Klein, O'Neill & Singh, LLP

(57) ABSTRACT

A brine filtration device disposable at a bottom portion of a brine storage tank has inner and outer tubes having a plurality of fine slits in order to mechanically trap any large undissolved salt crystals that may be entrained within a sodium chloride solution. A plurality of beads are disposed between the inner and outer tubes to cause the sodium chloride solution to change direction (i.e., cause turbulence) which further promotes or facilitates dissolution of any undissolved salt crystals entrained within the sodium chloride solution. The sodium chloride solution continues to flow through the slits of the inner tube which further traps or catches any undissolved salt crystals. Additional changes in flow direction of the sodium chloride solution are also contemplated to further increase or facilitate dissolution of undissolved salt crystals entrained in the sodium chloride solution.

14 Claims, 3 Drawing Sheets

(56) References Cited

U.S. PATENT DOCUMENTS

| | | |
|---|---|---|
| 5,366,632 A | 11/1994 | Balsimo et al. |
| 6,451,270 B1 | 9/2002 | Killian et al. |
| 6,736,153 B1 | 5/2004 | Kime |
| 7,186,390 B1 | 3/2007 | Hellbusch et al. |
| 7,396,455 B2 | 7/2008 | Heidbreder et al. |
| 8,955,546 B2 | 2/2015 | Vom et al. |
| 2002/0023869 A1 | 2/2002 | RemiZov |
| 2014/0251177 A1 | 9/2014 | Nesheim et al. |
| 2015/0375146 A1 | 12/2015 | Corominas |

OTHER PUBLICATIONS

Boal, Andrew K., On-Site Generation of Disinfectants, Tech Brief, Spring 2009, vol. 9, Issue 1.

* cited by examiner

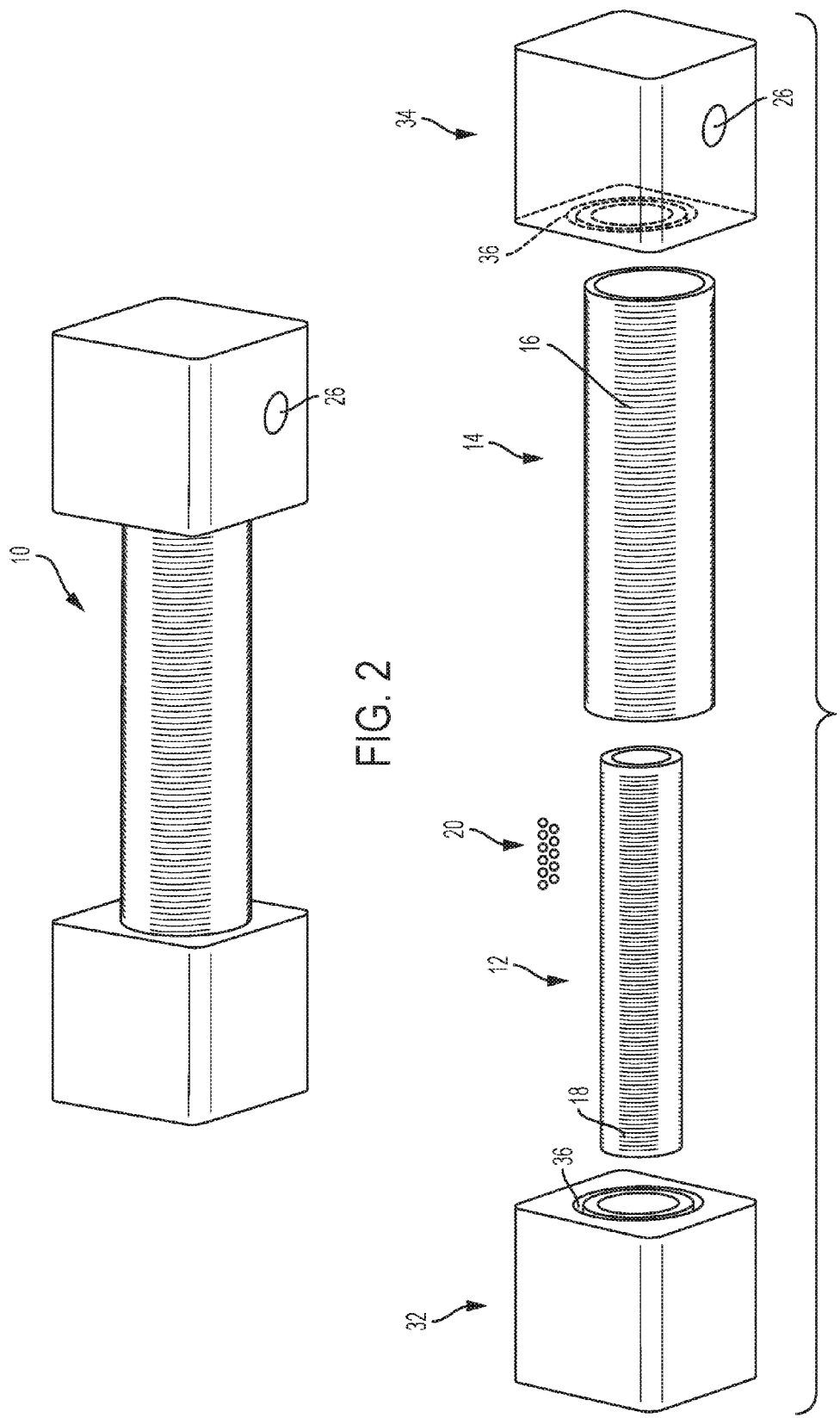

BRINE FILTRATION DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects described herein relate to a brine filtration system for a brine storage tank which may be part of a sodium hypochlorite generation system.

In prior art brine storage tanks, salt and water are mixed together to form a sodium chloride solution. Unfortunately, the sodium chloride solution may contain undissolved salt crystals that flow out of the brine storage tank which may cause damage to the system. Prior art mechanisms for removing undissolved salt crystals exists. However, these prior art mechanisms are deficient in one or more ways.

Accordingly, there is a need in the art for an improved method and apparatus for filtering undissolved salt crystals.

BRIEF SUMMARY

A brine filtration device disposable within a bottom portion of a brine storage tank is discussed. The brine storage tank may be a part of a sodium hypochlorite generation system. The device has inner and outer tubes defining a gap therebetween with a plurality of beads filled within the gap. The inner and outer tubes additionally have a plurality of slits across their entire length to allow a sodium chloride solution to flow through the plurality of slits of the outer tube to turbulently move around the beads disposed between the inner and outer tubes then flow through the plurality of slits of the inner tube. The slits of the inner and outer tubes catch any large sized undissolved crystals to prevent undissolved salt crystals from exiting the brine storage tank. The beads may cause turbulence in order to increase and facilitate dissolution of the undissolved salt crystal in the sodium chloride solution to further prevent any undissolved salt crystals from exiting the brine storage tank of the sodium hypochlorite generation system. Additionally, the flow of the sodium chloride solution changes direction once it passes through the inner tube and out of the brine filtration device 10 to further create turbulence and dissolve any undissolved salt crystals.

More particularly, a brine filtration device for facilitating mixing of sodium chloride and filtration of salt crystals to minimize entrainment of crystals in fluid exiting an output port of a brine storage tank is disclosed. The device may comprise an outer tube, an inner tube, a plurality of beads and an output port. The outer tube may have a length and an outer diameter. The length of the outer tube may be greater than the outer diameter of the outer tube. The outer tube may have a plurality of slits for facilitating flow of salt water through the outer tube from an exterior side of the outer tube to an interior side of the outer tube. The inner tube may define a length and an outer diameter. The length of the inner tube may be greater than the outer diameter of the inner tube. The inner tube may have a plurality of slits for facilitating flow of salt water through the inner tube from an exterior side of the inner tube to an interior side of the inner tube. The inner tube may be disposed within the outer tube. The plurality of beads may be disposed between the inner and outer tubes. The output port may be in fluid communication with the interior side so that all fluid flows from the exterior side of the outer tube to the interior side of the outer tube then from the exterior side of the inner tube to the interior side of the inner tube and out through the output port.

The inner and outer tubes may be disposed concentrically to each other.

The device may further comprise first and second end caps. The first end cap may be disposed on first ends of the inner and outer tubes. The second end cap may be disposed on opposed second ends of the inner and outer tubes. The first and second end caps may have cavities for positioning the inner and outer tubes. At least one of the first and second end caps may incorporate the output port. The first and second end caps may have grooves for receiving the first and second ends of the outer tube and an inner cavity for receiving the first and second ends of the inner tube.

The plurality of slits of the inner tube may be parallel to each other and oriented transverse to the length of the inner tube. Likewise, the plurality of slits of the outer tube may be parallel to each other and oriented transverse to the length of the outer tube. It is also contemplated that the slits of the inner tube may be skewed or perpendicular the slits of the outer tube.

The beads disposed between the inner and outer tubes may have a diameter of about 2 mm to 20 mm. The beads may be fabricated from an inert material. The inert material may be polyvinyl chloride.

The inner and outer tubes may be fabricated from an inert material. The inert material may be polyvinyl chloride. An outer surface of the inner tube may be gapped away from an inner surface of the outer tube between 1 cm to 20 cm. A width of the slit formed in the inner and outer tubes may be smaller than a diameter of one bead. The slits may each have a width between 0.1 to 0.5 mm.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 2 illustrates a brine filtration device disposed within a brine storage tank of the sodium hypochlorite generation system shown in FIG. 1;

FIG. 3 is an exploded view of the brine filtration device shown in FIG. 2; and

DETAILED DESCRIPTION

Figure 1:
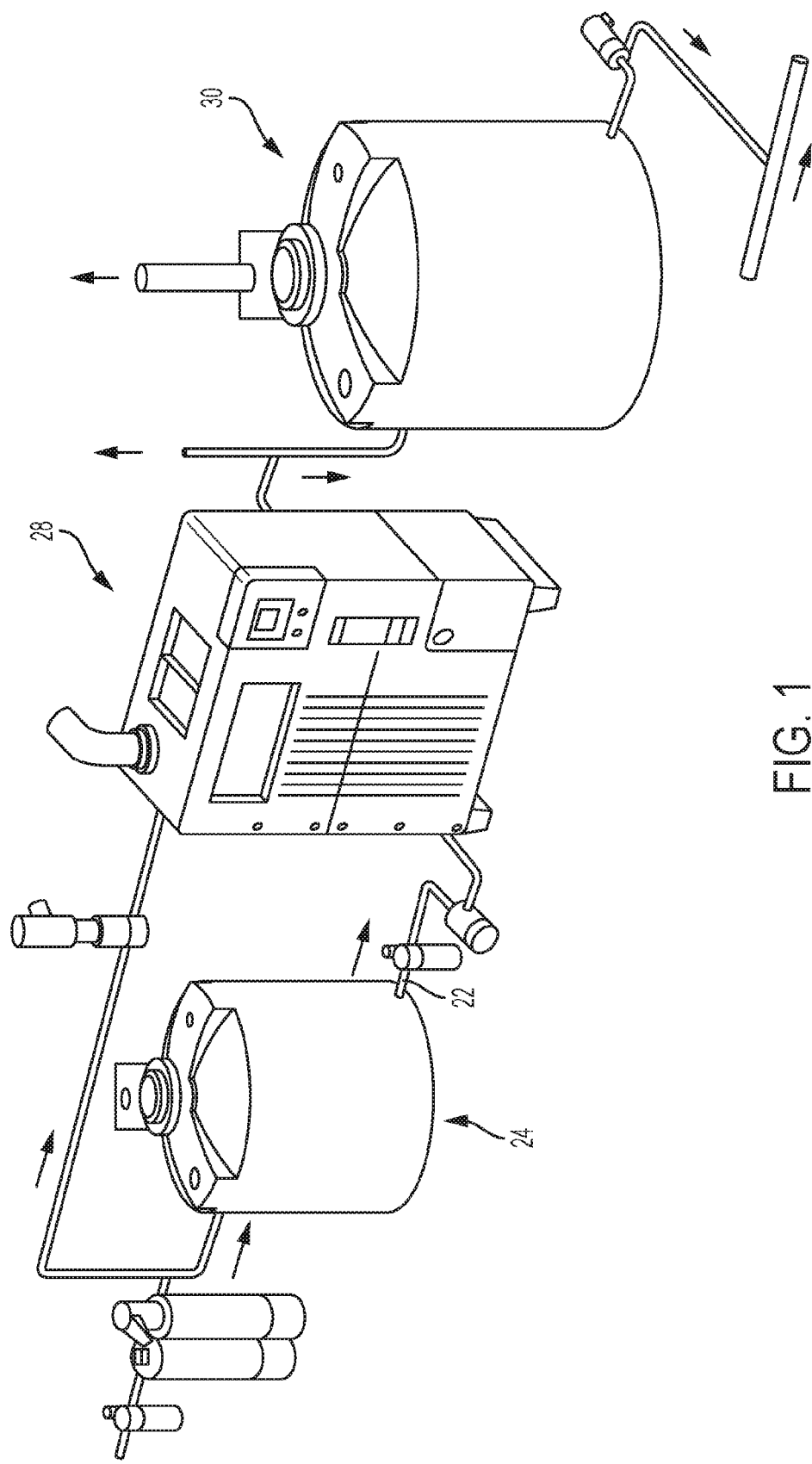
FIG. 1 illustrates a sodium hypochlorite generation system.

Referring now to the drawings, a brine filtration device 10 is shown. The device 10 includes inner and outer tubes 12, 14 having a plurality of slits 16, 18. Beads 20 are disposed between the inner and outer tubes 12, 14 so that any undissolved salt crystals that flow through the slits 16 of the outer tube 14 constantly changes flow patterns due to the beads 20 in order to facilitate dissolving of the undissolved salt crystals in the sodium chloride solution prior to the sodium chloride solution flowing through the slits 18 of the inner tube 12. The slits 16 of the outer tube 14 physically stop undissolved salt crystals from flowing through the device 10. Moreover, any undissolved salts that pass through the slits 16 of the outer tube 14 are dissolved between the outer tube 14 and the inner tube 12. The beads 20 facilitate dissolving of the salts and the fluid because it may cause turbulence. Moreover, any salt crystals that are not dissolved in the area between the tubes 12, 14 are also filtered by slits 18 of the inner tube and prevented from flowing through an output port 22 of the brine storage tank 24.

Referring now to FIG. 1, the brine filtration device 10 is disposed in the brine storage tank 24 shown in FIG. 1. The brine filtration device 10 is typically disposed at the bottom of the brine storage tank 24. The brine filtration device 10 has an output port 26 connected to the output port 22 of the brine storage tank 24. All fluid flowing out of the brine storage tank 24 flows out of the output port 26 of the brine filtration device 10.

With the brine filtration device 10 disposed at the bottom of the brine storage tank 24, salt is typically poured or disposed in the brine storage tank 24 to cover the brine filtration device 10. When water fills the brine storage tank 24, the salt dissolves in the water to form a sodium chloride solution. Preferably, an excess amount of salt is disposed in the brine storage tank 24 in order to saturate the water with sodium. Unfortunately, undissolved salt crystals may become entrained in the fluid flowing through the brine filtration device 10. The brine filtration device 10 must prevent the undissolved salt crystals from flowing through the brine filtration device 10 so that the sodium chloride solution flowing out of the output port 22 of the brine storage tank 24 does not have undissolved salt crystals.

The sodium chloride solution is fed into an electrolysis machine 28 which produces sodium hypochlorite. The sodium hypochlorite is stored in the storage tank 30.

Figure 4:
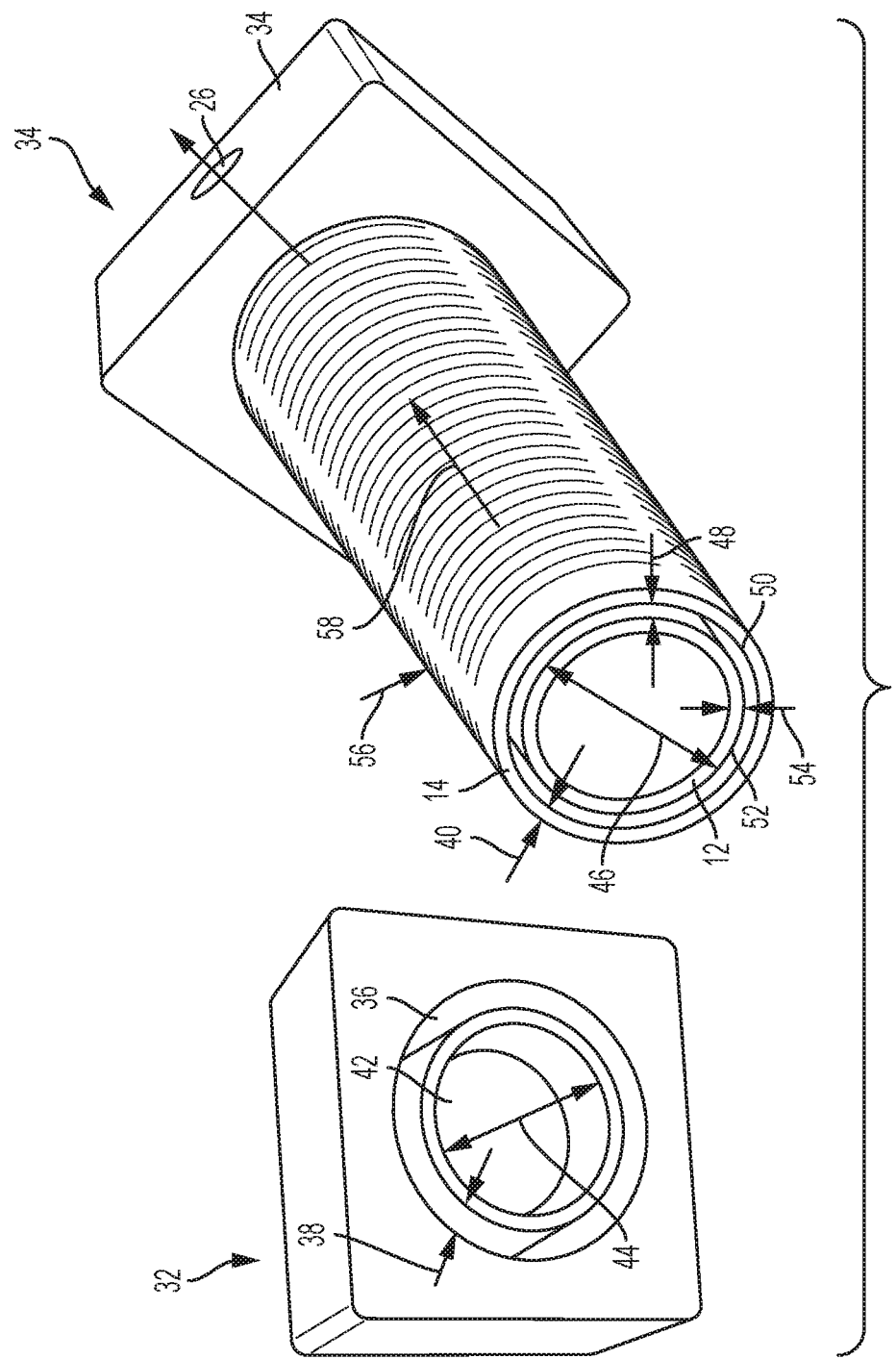
FIG. 4 is a partially exploded view of the brine filtration device showing an end view thereof.

The brine filtration device 10 includes the inner and outer tubes 12, 14 which are held in relative position with each other with end blocks 32, 34. Each of the end blocks 32, 34 may have a circular groove 36 which is sized and configured to snugly fit the outer tube 14. As shown in FIG. 4, the outer tube 14 is a hollow cylindrical tube. A width 38 of the circular groove 36 may be about equal to a thickness 40 of the outer tube 14. In this way, the outer tube 14 snugly fits within the circular groove 36 and forms a water tight seal therebetween. The end blocks 32, 34 may also have a circular cavity 42. An inner diameter 44 of the circular cavity 42 may be about equal to an outer diameter 46 of the inner tube 12 so that the inner tube 12 forms the water tight seal with the end blocks 32, 34. Moreover, the circular cavity 42 and the circular groove 36 define the relative positions of the inner and outer tubes 12, 14 with each other. Preferably, the inner and outer tubes 12, 14 are coaxially aligned with each other so that there is a consistent gap 48 between the inner surface 50 of the outer tube 14 and the outer surface 52 of the inner tube 12 about the entire circumference of the inner and outer tubes 12, 14. Alternatively, it is also contemplated that the inner and outer tubes 12, 14 may not be coaxially aligned so that there is an inconsistent gap 48 between the inner surface 50 of the outer tube 14 and the outer surface 52 of the inner tube 12 about the entire circumference of the inner and outer tubes 12, 14. In particular, the inner tube 12 may be positioned closer to the outer tube 14 on one side or the inner tube 12 may be tilted so that one end of the inner tube 12 is closer to one side of the outer tube 14 while the other end of the inner tube 12 is closer to the opposite side of the outer tube 14.

Although the tubes 12, 14 have been described as having a cylindrical shape, other shapes 42 are also contemplated. By way of example and not limitation, the tubes 12, 14 may have an elongate oval configuration, square configuration, triangular configuration or other polygonal configuration. For polygonal shaped tubes 12, 14, the slits 16, 18 may be formed on the flat sides of the polygonal configured tubes 12, 14 but it is also contemplated that the slits 16, 18 may be formed at corners of the polygonal configured tubes 12, 14. Moreover, the inner and outer tubes 12, 14 may have different shapes with respect to each other. By way of example and not limitation, the outer tube may have a cross sectional polygonal configuration, whereas, the inner tube 12 may have a circular cross-sectional configuration, and vice versa.

The tubes 12, 14 define thickness 54, 40. The slits 16 of the outer tube 40 is the first filtration mechanism for preventing undissolved salt crystals from flowing through the brine filtration device 10. In this regard, the thickness 40 of the outer tube 14 determines a depth of the slit 16. In general, the greater the thickness 40 of the outer tube 14, the better it is able to mechanically trap undissolved salt crystals since undissolved salt crystals would have a higher likelihood of being mechanically caught in the slits 16 since the undissolved salt crystals travel through the slits 16 for a longer period of time. As the undissolved salt crystals twists and turns as it travels through the slits 16, a maximum width of the undissolved salt crystal may be greater than the width of the slits 16 and when the greatest width of the undissolved salt crystal is aligned to the slits 16, the undissolved salt crystals will be mechanically trapped or caught in the slits by friction.

The tubes 12, 14 may be fabricated from an inert material so as to not have any chemical reaction with the sodium chloride solution, salt or water. By way of example and not limitation, the tubes 12, 14 may be fabricated from polyvinyl chloride.

The slits 16, 18 preferably have a width between 0.1 mm to 0.5 mm. Preferably, the slit 16, 18 width is as small as possible. Preferably, the slits 18 of the inner tube 12 have a width that is smaller than the width of the slits 16 of the outer tube 14. The slits 16, 18 are shown as being straight and parallel with the adjacent slits 16, 18. Moreover, the slits 16, 18 are shown as not extending about the entire circumference of the tubes 12, 14 but only partially thereabout. Slits 16, 18 are preferably about 2 inch long each but it may be between one-half (½) inch to four (4) inches long.

Although the slits 16, 18 are shown as being straight, other slit configurations are also contemplated. By way of example and not limitation, the slits 16, 18 may be straight, curved, zigzag. Moreover, the slits 16, 18 may be placed or positioned equidistant from its adjacent slits 16, 18. Alternatively, the slits 16, 18 may be placed in random order about the entire circumference of the tubes 12, 14 or a portion of the tubes 12, 14.

If an undissolved salt crystal is trapped in the slit 16 of the outer tube 14, then as sodium chloride solution flows through that slit 16, the sodium chloride solution continues to dissolve the trapped undissolved salt crystal until it is small enough to break free from the slit 16 and flow into the gap 48 between the inner and outer tubes 12, 14. When the undissolved salt crystal flows through the gap 48, the beads 20 cause the sodium chloride solution and the undissolved salt crystal to constantly change direction producing turbulence and further facilitate dissolution of the undissolved salt crystal. Preferably, The slits 16 are sized to be small enough so that any undissolved salt crystals that are small enough to flow through the slits 16 of the outer tube 14 can be fully dissolved through the turbulent and multidirectional action caused by the beads 20 in the gap 48 between the inner and outer tubes 12, 14 before the undissolved salt crystal reaches the slits 18 of the inner tube 12.

The gap 48 between the inner surface 50 of the outer tube 14 and the outer surface 52 of the inner tube 12 is preferably between about 1 cm and about 20 cm. The beads 20 may have a circular shape but other shapes are also contemplated. Preferably, the beads 20 have a max diameter of about 2 mm to about 20 mm. In this way, multiple beads 20 can be stacked within the gap 48 so that undissolved salt crystals must flow around multiple beads 20 and change directions before flowing through slits 18 of the inner tube 12. The multiple changes in direction may cause turbulence which help to dissolve undissolved salt crystals.

The beads 20 are preferably fabricated from an inert material such as polyvinyl chloride. However, other inner materials are also contemplated. The inert material does not change the chemical composition of the sodium chloride solution. The beads 20 may be packed tightly within the gap 48 so that beads 20 do not shift as the sodium chloride solution flows through the brine filtration device 10. Alternatively, the beads 20 may be packed loosely within the gap 48 so that the beads 20 shift as the sodium chloride solution flows through the brine filtration device 10. Preferably, the beads 20 are packed tightly in the gap 48 in order to force the sodium chloride solution to flow in multiple directions before the sodium chloride solution flows through the slits 18 of the inner tube 12.

The beads 20 may have a spherical shape, oval shape, polygonal shape (e.g., six or more flat sides which are preferably not equal to each other in area but may be equal to each other in area). Preferably, the shape of the beads 20 allow the plurality of beads 20 to form small channels between the beads 20 and do not block the flow of fluid as the fluid and or sodium chloride solution flows from the outer tube 14 to the inner tube 12. Additionally, the shape of the beads 20 is preferably non-symmetrical to increase the potential for turbulence of the sodium chloride solution as it flows from the outer tube 14 to the inner tube 12.

After the sodium chloride solution flows through the slits 18 of the inner tube 12, the sodium chloride solution changes from the direction 56 to a direction 90° therefrom as shown by directional arrow 58 once the sodium chloride solution meets the end block 34, the sodium chloride solution changes direction as shown by a directional arrow 60. These changes in direction of the sodium chloride solution further facilitate dissolving of any undissolved salt crystal in the solution.

The brine filtration device 10 needs to be cleaned periodically. In order to do so, water may be flowed backwards through the brine filtration system 10. Water is flowed through the output port 26, the inner tube 12, through the slits 18 of the inner tube 12, through the beads 20, through the slits 16 of the outer tube 14. By flowing water backwards through the brine filtration device 10, buildup of any undissolved salt crystals are physically removed or dissolved.

The tubes 12, 14 discussed herein have been shown as having a cylindrical shape. However, other shapes for the tubes 12, 14 are also contemplated and included within the scope of the tubes 12, 14. By way of example and not limitation, the tubes 12, 14 may be spherical. The outer sphere may be larger than the inner sphere and the inner sphere disposed within the outer sphere. An output line may be connected to the inner sphere in order to route filtered sodium chloride solution to the output port of the brine storage tank. Other configurations such as oval shapes, box shapes, polygonal shapes may also be used in lieu of cylindrical shapes.

The above description is given by way of example, and not limitation. Given the above disclosure, one skilled in the art could devise variations that are within the scope and spirit of the invention disclosed herein, including various ways of forming the end blocks. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A brine filtration device for facilitating mixing of sodium chloride into a fluid and filtration of salt crystals out of the fluid to minimize entrainment of the salt crystals in the fluid exiting an output port of a brine storage tank, the device comprising:

an outer tube having a length and an outer diameter, the length of the outer tube being greater than the outer diameter of the outer tube, the outer tube having a plurality of slits for facilitating flow of the fluid through the outer tube from an exterior side of the outer tube to an interior side of the outer tube, each of the slits of the outer tube having a width that is between 0.1 to 0.5 mm;

an inner tube defining a length and an outer diameter, the length of the inner tube being greater than the outer diameter of the inner tube, the inner tube having a plurality of slits for facilitating flow of the fluid through the inner tube from an exterior side of the inner tube to an interior side of the inner tube, each of the slits of the inner tube having a width that is between 0.1 to 0.5 mm, the inner tube being disposed within the outer tube;

a plurality of beads disposed between the inner and outer tubes, each of the beads having a diameter of between 2 to 20 mm;

an output port in fluid communication with the interior side of the inner tube so that the fluid flows from the exterior side of the outer tube to the interior side of the outer tube then from the exterior side of the inner tube to the interior side of the inner tube and out through the output port.

2. The device of claim 1 wherein the inner and outer tubes are disposed concentrically to each other.

3. The device of claim 1 further comprising first and second end caps, the first end cap disposed on first ends of the inner and outer tubes, the second end cap disposed on opposed second ends of the inner and outer tubes, the first and second end caps having cavities for positioning the inner and outer tubes, at least one of the first and second end caps incorporating the output port.

4. The device of claim 3 wherein the first end cap has a groove for receiving the first end of the outer tube and an inner cavity for receiving the first end of the inner tube, and the second end cap has a groove for receiving the second end of the outer tube and an inner cavity for receiving the second end of the inner tube.

5. The device of claim 1 wherein the plurality of slits of the inner tube are parallel to each other and oriented transverse to the length of the inner tube, and the plurality of slits of the outer tube are parallel to each other and oriented transverse to the length of the outer tube.

6. The device of claim 1 wherein the beads are fabricated from an inert material.

7. The device of claim 6 wherein the inert material is polyvinyl chloride.

8. The device of claim 1 wherein the inner and outer tubes are fabricated from an inert material.

9. The device of claim 8 wherein the inert material is polyvinyl chloride.

10. The device of claim 1 wherein an outer surface of the inner tube is gapped away from an inner surface of the outer tube between 1 cm to 20 cm.

11. The system of claim 1, wherein the width of each of the slits of the inner tube is smaller than the width of each of the slits of the outer tube.

12. A system for providing brine for the generation of sodium hypochlorite, the system comprising:
   a brine storage tank for storing water and sodium chloride;
   a brine filtration device disposable at a lower half of the brine storage tank for facilitating mixing of the sodium chloride and the water to produce a fluid and filtration of salt crystals out of the fluid to minimize entrainment of the salt crystals in the fluid exiting an output port of a brine storage tank, the device having:
      an outer tube having a length and an outer diameter, the length of the outer tube being greater than the outer diameter of the outer tube, the outer tube having a plurality of slits for facilitating flow of the fluid through the outer tube from an exterior side of the outer tube to an interior side of the outer tube, each of the slits of the outer tube having a width that is between 0.1 to 0.5 mm;
      an inner tube defining a length and an outer diameter, the length of the inner tube being greater than the outer diameter of the inner tube, the inner tube having a plurality of slits for facilitating flow of the fluid through the inner tube from an exterior side of the inner tube to an interior side of the inner tube, each of the slits of the inner tube having a width that is between 0.1 to 0.5 mm, the inner tube being disposed within the outer tube;
      a plurality of beads disposed between the inner and outer tubes, each of the beads having a diameter of between 2 to 20 mm; and
      an output port in fluid communication with the interior side of the inner tube so that the fluid flows from the exterior side of the outer tube to the interior side of the outer tube then from the exterior side of the inner tube to the interior side of the inner tube and out through the output port.

13. The system of claim 12, wherein the width of each of the slits of the inner tube is smaller than the width of each of the slits of the outer tube.

14. A system for generating sodium hypochlorite, the system comprising:
   the system of claim 12; and
   an electrolysis machine downstream of the brine storage tank to receive the fluid and generate sodium hypochlorite.

* * * * *